April 22, 1941.  M. H. GOLDBERG  2,238,934

SIGN PROJECTION APPARATUS

Filed March 2, 1939  3 Sheets-Sheet 1

INVENTOR.
Maurice H. Goldberg.
BY
Rasmussen & Brugman.
ATTORNEYS.

April 22, 1941.  M. H. GOLDBERG  2,238,934
SIGN PROJECTION APPARATUS
Filed March 2, 1939  3 Sheets-Sheet 2

INVENTOR.
Maurice H. Goldberg.
BY Rasmussen & Brugman
ATTORNEYS.

April 22, 1941.                M. H. GOLDBERG                2,238,934
                         SIGN PROJECTION APPARATUS
                           Filed March 2, 1939            3 Sheets-Sheet 3
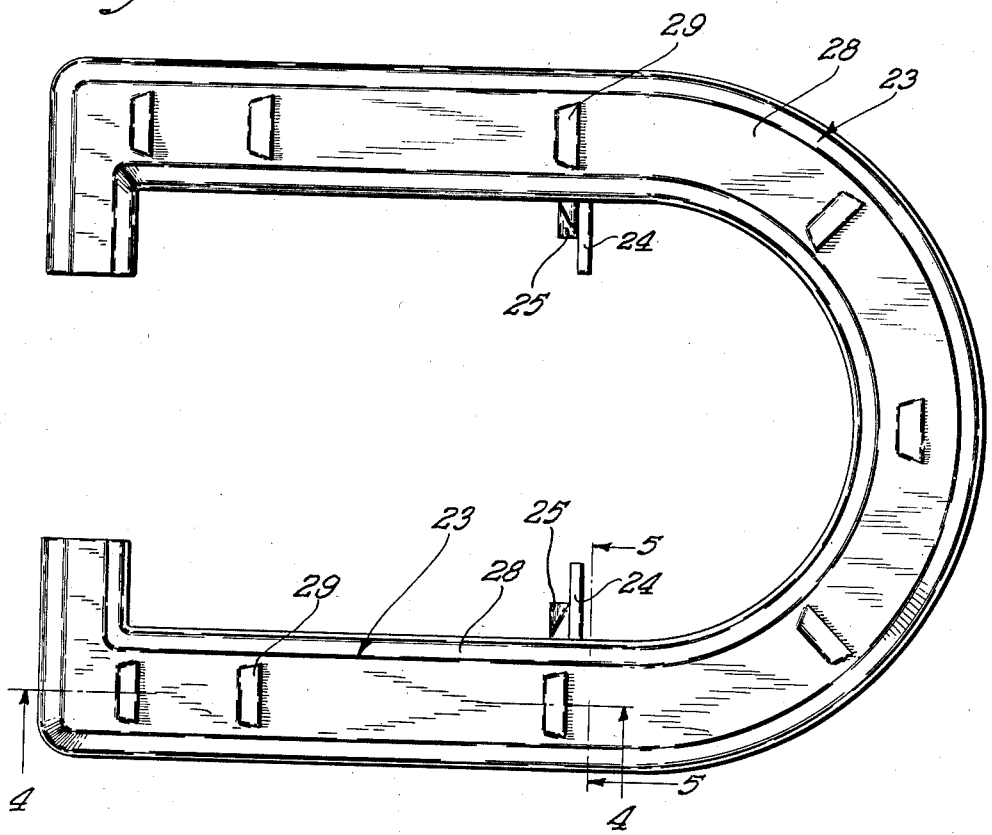
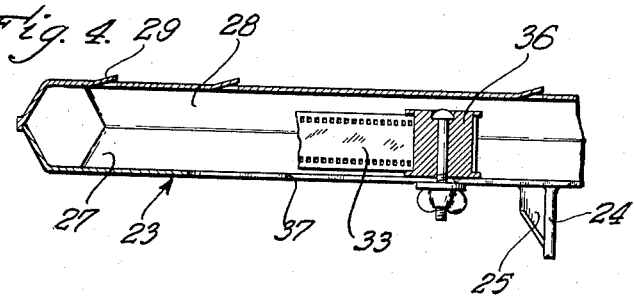
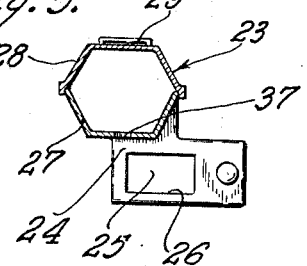
INVENTOR.
Maurice H. Goldberg.
BY
Rasmussen & Brugman
ATTORNEYS.

Patented Apr. 22, 1941

2,238,934

UNITED STATES PATENT OFFICE 2,238,934

SIGN PROJECTION APPARATUS

Maurice H. Goldberg, Chicago, Ill.

Application March 2, 1939, Serial No. 259,332

1 Claim. (Cl. 88—24)

This invention relates in general to projection apparatus, and has more particular reference to an improved sign projection apparatus which is adapted to display a moving image continuously.

In this type of projection apparatus (as disclosed in my prior United States Letters Patent, No. 2,090,672, issued August 24, 1937, the generation of heat over a relatively long period of operation and the resulting effect of such heat upon the film employed present serious difficulties.

A principal object of the invention, therefore, is the provision of improved means for dissipating the heat generated in such projection apparatus, and for protecting the film employed therein.

More specifically, these results are attained by providing a vented lamp housing, a separate film housing adapted to enclose the film which is also vented and mounted in spaced relationship to the lamp housing, and means for continuously circulating air between said housings and through the lamp housing and film housing.

Another important object of the invention is to provide means for directing a current of air around a frame for guiding the film through the field of the lenses employed in a projection apparatus to aid in maintaining such frame and the film in a relatively cool condition.

Another important object of the invention is the provision of means placed between the light source and the film for absorbing heat generated in such projection apparatus to aid in protecting the film employed therein.

A further important object of the invention is the provision of means for directing a current of air against and past the condensing lens employed in a projection apparatus to prevent condensation of moisture thereon.

Numerous other objects and advantages of the invention will be apparent as it is better understood from the following description, which, when taken in connection with the accompanying drawings, discloses a preferred embodiment thereof.

In the drawings,

Fig. 3 is a top plan view of the film housing with the cover placed thereon;

Fig. 4 is a sectional view of a portion of the film housing taken substantially on line 4—4 of Fig. 3; and Fig. 5 is a cross-sectional view of the film housing taken substantially on line 5—5 of Fig. 3.

Figure 1:
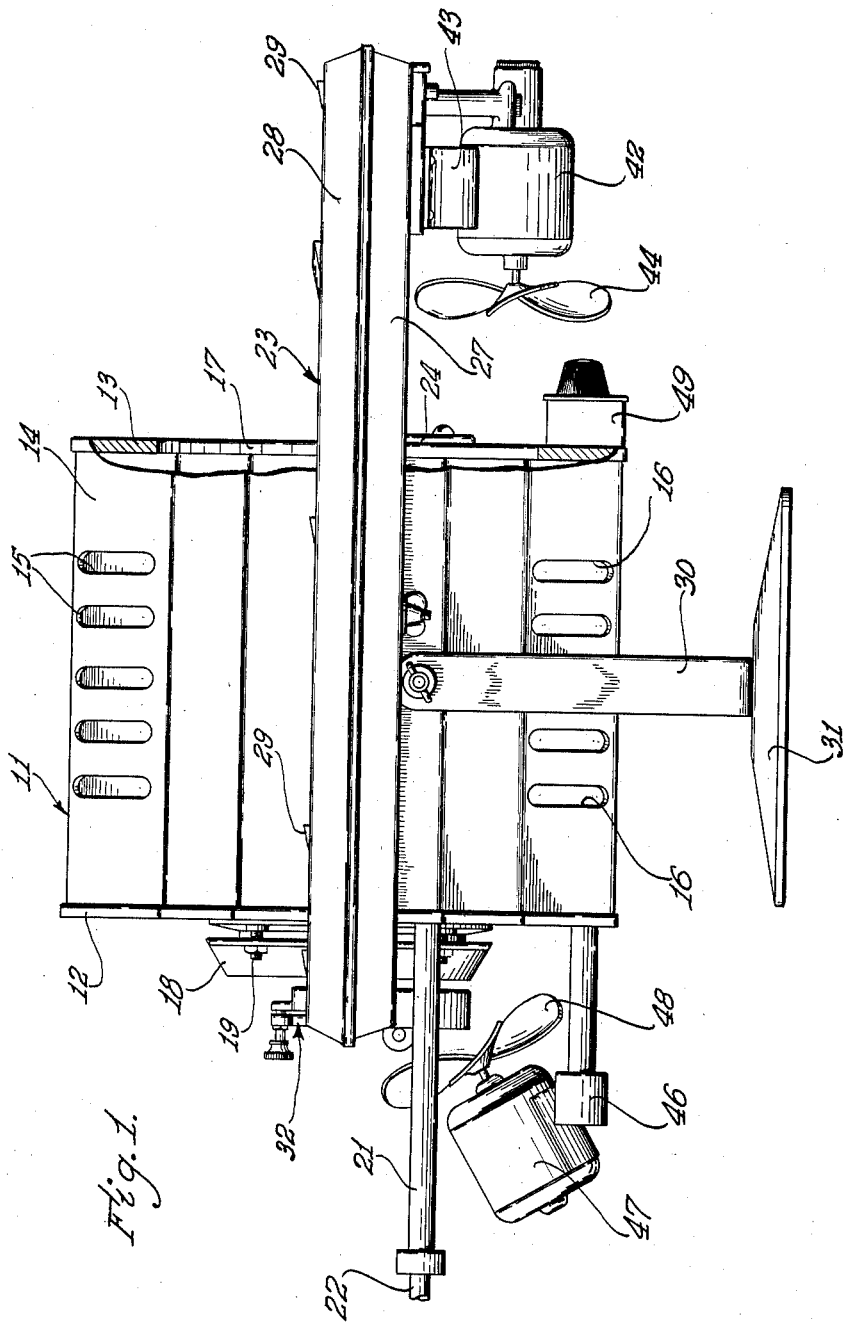
Figure 1 is a side elevational view of a projection device embodying the features of the instant invention with a part of the side wall of the lamp housing broken away.

Referring more particularly to the drawings, reference numeral 11 indicates in general a lamp housing within which are mounted a light source or lamp, reflector and condensing lenses that are employed in the usual projection apparatus. The lamp housing 11 comprises front and rear walls 12 and 13, respectively, between which is mounted a shell 14 having a series of apertures or louvers 15 in the upper walls and similar apertures 16 in the lower walls thereof. The rear wall 13 is provided with a substantially centrally located aperture 17 for a purpose to be later described. The condensing lenses are preferably mounted directly adjacent a suitable aperture in the front wall 12 of the lamp housing 11, and are held in place by a cap member 18 which may be secured to the lamp housing 11 by retaining screws 19. A pair of tubular members 21 are mounted at the forward end of the lamp housing 11 for adjustably supporting the usual object lens by means of the sliding members 22 mounted thereon.

Surrounding the lamp housing 11 is a substantially U-shaped housing 23 which is secured to the lamp housing in spaced relationship thereto by means of suitable brackets 24. Suitable deflectors 25 (Fig. 5) are formed in the brackets 24 which are adapted to force air currents upwardly for a purpose to be more fully described hereinafter. The brackets 24 also have apertures 26 formed therein to allow the passage of air therethrough. The outer housing 23 comprises a lower channel member 27 from which the brackets 24 extend, and a removable cover member 28 which is complemental to the channel member 27 and is adapted to be secured thereto in any desired manner. The cover member 28 has a plurality of openings 29 formed in the upper surface thereof to allow for the circulation of air through the housing 23. The housings 11 and 23 may be mounted for universal adjustment upon a U-shaped supporting frame 30 and a base or standard 31 pivotally secured thereto.

The forward open end of the outer housing 23 terminates adjacent the periphery of the cap member 18. Disposed within this open part of the housing 23 in spaced relationship to the cap member 18 is a film guiding frame member 32 having suitable apertures therein for guiding a film in its movement through the field of the lenses of the projector. A suitable heat absorbing medium or glass is provided in the film guiding frame member 32 between the light source and the film, which helps to absorb the heat generated by the light source and to aid in protecting the film employed therein from deteriorating or otherwise becoming destroyed prematurely.

Figure 2:
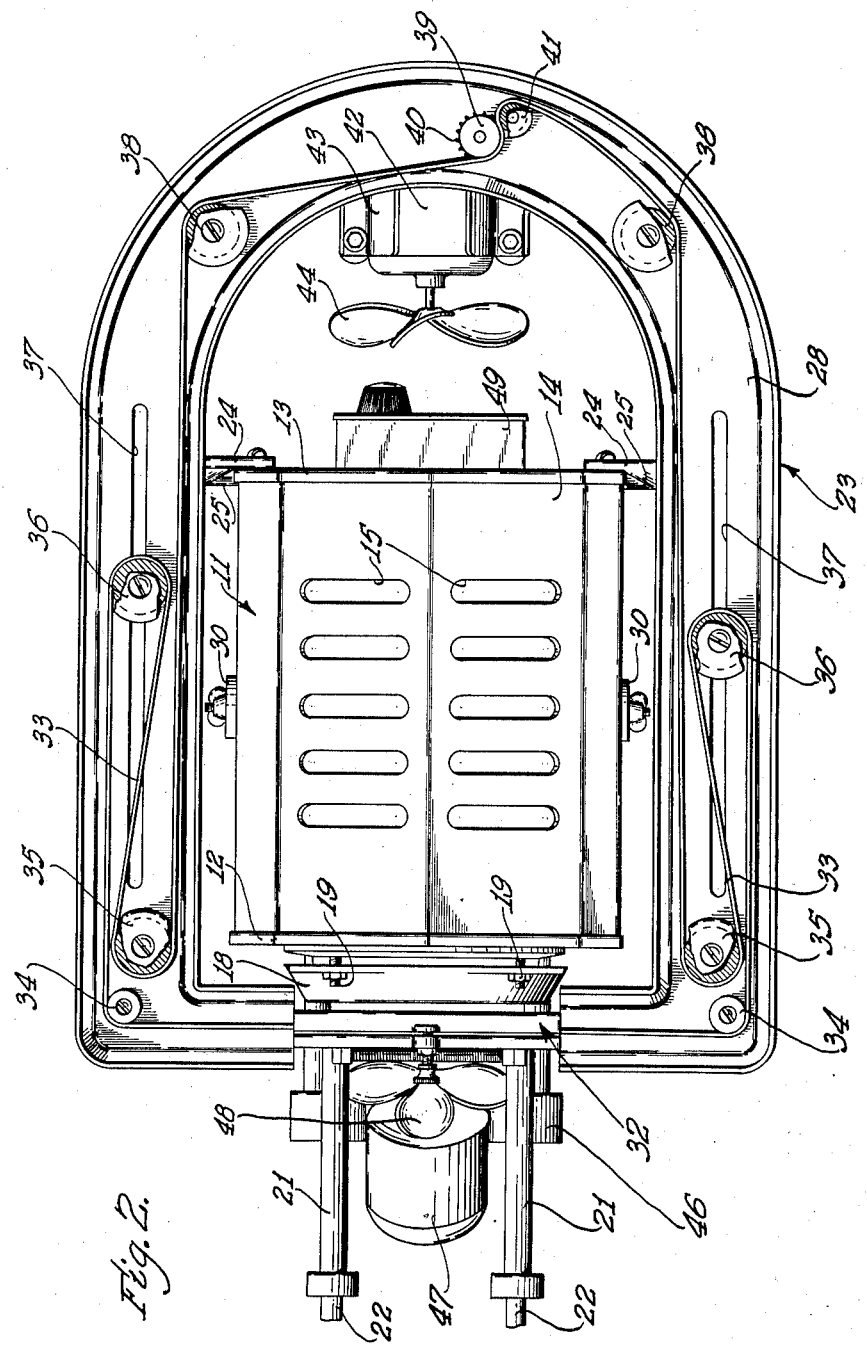
Fig. 2 is a top plan view of the device of Fig. 1 with the cover for the film housing removed.

A plurality of spools or guide pulleys are rotatably mounted on vertical pivots secured to the channel member 27 and disposed within the outer housing 23 to provide supporting means for an endless film 33. These pulleys include a pair of spools 34 mounted adjacent the forward outer corners of the housing 23, a second pair of spools 35 disposed slightly to the rear of the spools 34, a third pair of spools 36 removably secured for longitudinal adjustment in elongated slots 37 formed in the lower surface of the channel member 25, and another pair of spools 38 disposed within the rear portion of the housing 23, as shown in Fig. 2. The elongated slots 37 also provide means for permitting air to be introduced into the housing 23 for a purpose to be more particularly described hereinafter. Adjacent the center of the rear portion of the housing 23 is a driving spool 39 having teeth 40 for engaging the usual apertures provided adjacent the marginal edges of the film 33. An idler pulley 41 is mounted adjacent the driving pulley 39 to resiliently maintain the film 33 in driving engagement therewith. It will thus be apparent that the path of travel of the film 33 is from the driving pulley 39 over one of the pulleys 36 to the associated pulley 35, around the latter and rearwardly to the adjacent pulley 36, around the latter and forwardly around the associated pulley 34, and then across the front end of the housing 23 through the guide frame 32 and the field of vision of the lenses to the other pulley 34. From there the path of travel of the film is similar to that above described back to the driving pulley 39 around the several pulleys 36, 35, and 38. By adjusting one or both of the pulleys 36, different lengths of film may be employed and the desired tension may be maintained in the film.

The driving pulley 39 is adapted to be directly connected to a motor 42 which is suspended by a bracket 43 from the channel member 27 adjacent the rear end thereof. The forward end of the shaft of the motor 42 extends outwardly therefrom and has a suitable fan 44 secured thereto.

Extending forwardly from the lamp housing 11 adjacent the lower end thereof are a pair of rods 45 upon the outer ends of which is mounted an angularly disposed bracket 46. The bracket 46 supports an electric motor 47 so that its shaft is angularly disposed relative to the rods 45 and the front wall of the casing 11 in a vertical plane. Mounted on the upper and rearward end of the shaft of the motor 47 is a fan 48. The motors 47 and 42 are connected to a suitable source of electric energy in any desired manner, and may be controlled in operation by a rheostat switch 49, which is preferably mounted on the rear wall 13 of the lamp housing 11 adjacent the lower end thereof.

With the above described arrangement, the motor 42 is adapted to continuously drive the endless film 33 through the field of the lenses of the projector so that a moving image thereof may be projected upon a suitable screen or other reflecting surface in the usual manner. During continued operation of such a projection apparatus, the lamp or light source within the housing 11 generates an appreciable amount of heat which would normally detrimentally effect the film 33 and the operation of the device.

The fan 44 is so positioned as to force currents of air between the housings 11 and 23 through the vented lamp housing 11 and into the film housing 23. Part of the air from the fan 44 passes through the apertures 26 in the brackets 24 and is deflected upwardly by means of the deflectors 25. The deflected air will enter the film housing 23 through the elongated slots 37 and will absorb any heat that might be retained in the film 33. The air after passing over the film 33 will be forced out through the plurality of openings 29, formed in the cover member 28, thus insuring a positive circulation of air in the film housing.

The fan 48 is so positioned as to force currents of air around the guide frame 32, against and past the lenses in the forward end of the housing 11, to help dissipate the heat generated within the lamp housing 11.

It is to be understood, however, that while ordinary fan blades 44 and 48 are disclosed and described in the above description, any other means of inducing air currents around the guide frame 32 and through the housings 11, 23 may be used, such as, a turbine type of blade having conduits directly connected to the guide frame, the film housing 23 and the lamp housing 11.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

In a projection apparatus, a lamp housing, condensing and object lenses supported by said housing adjacent the front end thereof, a guide frame mounted exteriorly of said housing in the field of said lenses, a separate second housing surrounding said lamp housing in air-separated relationship thereto, air vents in said lamp housing and in said second housing, an endless film enclosed within said second housing and adapted to be moved through said frame, a fan mounted exteriorly of said housings adjacent the rear end thereof for forcing air currents between said air-separated housings, a motor for driving said fan and said film, a second fan mounted exteriorly of said housings adjacent the front end thereof for forcing currents of air around said frame, against said lenses and between said housings, and a second motor for driving said second fan.

MAURICE H. GOLDBERG.